US011709531B2

(12) United States Patent
Cieslak et al.

(10) Patent No.: US 11,709,531 B2
(45) Date of Patent: *Jul. 25, 2023

(54) CONFIGURATION MANAGEMENT BASED ON THERMAL STATE (71) Applicant: Snap Inc., Santa Monica, CA (US)

(72) Inventors: Michael Cieslak, Los Angeles, CA (US); Jiayao Yu, Venice, CA (US); Kai Chen, Manhattan Beach, CA (US); Farnaz Azmoodeh, Venice, CA (US); Michael David Marr, Monroe, WA (US); Jun Huang, Beverly Hills, CA (US); Zahra Ferdowsi, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,899

(22) Filed: Jun. 23, 2022

(65) Prior Publication Data

US 2022/0317746 A1 Oct. 6, 2022

Related U.S. Application Data (63) Continuation of application No. 16/385,568, filed on Apr. 16, 2019, now Pat. No. 11,442,513.

(51) Int. Cl.
G06F 9/445 (2018.01)
G06F 1/20 (2006.01)
G01K 3/00 (2006.01)
G06F 9/48 (2006.01)

(52) U.S. Cl.
CPC .............. *G06F 1/206* (2013.01); *G01K 3/005* (2013.01); *G06F 9/44505* (2013.01); *G06F 9/4893* (2013.01)

(58) Field of Classification Search
None
See application file for complete search history.

(56) References Cited

U.S. PATENT DOCUMENTS

| 6,442,700 | B1 | 8/2002 | Cooper |
| 9,146,814 | B1 | 9/2015 | Merwe et al. |
| 9,557,792 | B1 | 1/2017 | Potlapally et al. |
| 10,412,022 | B1 | 9/2019 | Tang et al. |
| 10,697,661 | B2 | 6/2020 | Chen et al. |
| 11,140,243 | B1 | 10/2021 | Cieslak et al. |
| 11,368,558 | B1 | 6/2022 | Cieslak et al. |
| 11,442,513 | B1 | 9/2022 | Cieslak et al. |
| 2006/0090161 | A1 | 4/2006 | Bodas et al. |
| 2010/0073068 | A1 | 3/2010 | Cho et al. |

(Continued)

FOREIGN PATENT DOCUMENTS

WO 2013101116 A1 7/2013

*Primary Examiner* — Paul Yen
(74) *Attorney, Agent, or Firm* — Culhane Meadows PLLC; Stephen J. Weed (57) ABSTRACT The systems and methods manage thermal states of a device through user configuration of a client application on the device. The systems and methods set thermal thresholds associated with the device. The systems and methods infer the thermal thresholds from information gathered by a client application running on the device. The systems and methods implement a stored policy associated with a violation of one of the thermal thresholds by one of the monitored thermal states.

20 Claims, 7 Drawing Sheets (56) References Cited

U.S. PATENT DOCUMENTS

| | | |
|---|---|---|
| 2011/0320061 A1 | 12/2011 | Chen |
| 2012/0110352 A1 | 5/2012 | Branover et al. |
| 2012/0272086 A1 | 10/2012 | Anderson et al. |
| 2013/0013126 A1 | 1/2013 | Salsbery et al. |
| 2013/0132972 A1 | 5/2013 | Sur et al. |
| 2013/0138419 A1 | 5/2013 | Lopez et al. |
| 2013/0159741 A1 | 6/2013 | Schluessler et al. |
| 2013/0305257 A1 | 11/2013 | Otomo et al. |
| 2014/0006818 A1 | 1/2014 | Doshi et al. |
| 2014/0013098 A1 | 1/2014 | Yeung |
| 2014/0222242 A1 | 8/2014 | Poornachandran et al. |
| 2015/0074469 A1 | 3/2015 | Cher et al. |
| 2015/0169381 A1* | 6/2015 | Ramadoss ............... G06F 1/32  345/522 |
| 2017/0302782 A1 | 10/2017 | Wang et al. |
| 2017/0321921 A1 | 11/2017 | Chen et al. |
| 2017/0339178 A1 | 11/2017 | Mahaffey et al. |
| 2017/0373955 A1 | 12/2017 | Kocoloski et al. |
| 2018/0157298 A1 | 6/2018 | Shah et al. |
| 2019/0089611 A1 | 3/2019 | Kondalam et al. |
| 2019/0155712 A1 | 5/2019 | Tiwari et al. |
| 2020/0174542 A1 | 6/2020 | Rao et al. |

* cited by examiner

FIG. 11

CONFIGURATION MANAGEMENT BASED ON THERMAL STATE

CROSS-REFERENCE TO RELATED APPLICATIONS

This application is a continuation of U.S. application Ser. No. 16/385,568 filed on Apr. 16, 2019, the contents of which are incorporated fully herein by reference.

TECHNICAL FIELD

The present disclosure relates to thermal throttling of mobile devices, and more particularly, to adaptive thermal throttling with capability for configuration.

BACKGROUND

Devices with reduced form factors typically rely on passive cooling to avoid overheating. Thermal thresholds and limitations for devices are generally set by device manufacturers.

BRIEF DESCRIPTION OF THE DRAWINGS

To easily identify the discussion of any particular element or act, the most significant digit or digits in a reference number refer to the figure number in which that element is first introduced.

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which.

DETAILED DESCRIPTION

Aspects of the subject matter disclosed herein are directed to systems and methods for monitoring the thermal status of a device and allowing a user to configure the performance or functionality of an application (e.g., a social media application) running on the device. The user configuration may be provided locally or remotely as, for example, over the internet. Thermal management may be accomplished through the monitoring of thermal states associated with components of the device and the implementation of stored policies in response to the detection that the thermal states have exceeded specified thresholds. The policies and thresholds may be included in the user specified configuration.

The description that follows includes systems, methods, techniques, instruction sequences, and computing machine program products illustrative of examples of the disclosure. In the following description, for the purposes of explanation, numerous specific details are set forth in order to provide an understanding of various examples described herein. It will be evident, however, to those skilled in the art, that examples of the described subject matter may be practiced without these specific details. In general, well-known instruction instances, protocols, structures, and techniques are not necessarily shown in detail.

In accordance with one example, a method is provided for managing the thermal threshold of a device through user input of an application. The method includes setting, by a processor, thermal thresholds associated with the device; receiving, by the processor, thermal configuration settings from a user of the device; updating a policy stored within the device responsive to the thermal configuration settings from a user; monitoring, by the processor, thermal states associated with the device; and implementing, by the processor, the thermal configuration settings of the stored policy responsive to a violation of one of the thermal thresholds by one of the monitored thermal states.

In accordance with another example, a system is provided for managing the thermal threshold of a device through user input of an application. The system includes setting, by the processor, thermal thresholds associated with the device; receiving, by the processor, thermal configuration settings from a user of the device; updating a policy stored within the device responsive to the thermal configuration settings from a user; monitoring, by the processor, thermal states associated with the device; and implementing, by the processor, the thermal configuration settings of the stored policy responsive to a violation of one of the thermal thresholds by one of the monitored thermal states.

In accordance with yet another example, a non-transitory processor-readable storage medium is provided that stores processor-executable instructions that, when executed by a processor of a machine, cause the machine to perform operations. The operations performed by the machine include setting thermal thresholds associated with the device; receiving thermal configuration settings from a user of the device; updating a policy stored within the device responsive to the thermal configuration settings from a user; monitoring thermal states associated with the device; and implementing the thermal configuration settings of the stored policy responsive to a violation of one of the thermal thresholds by one of the monitored thermal states.

Figure 1:
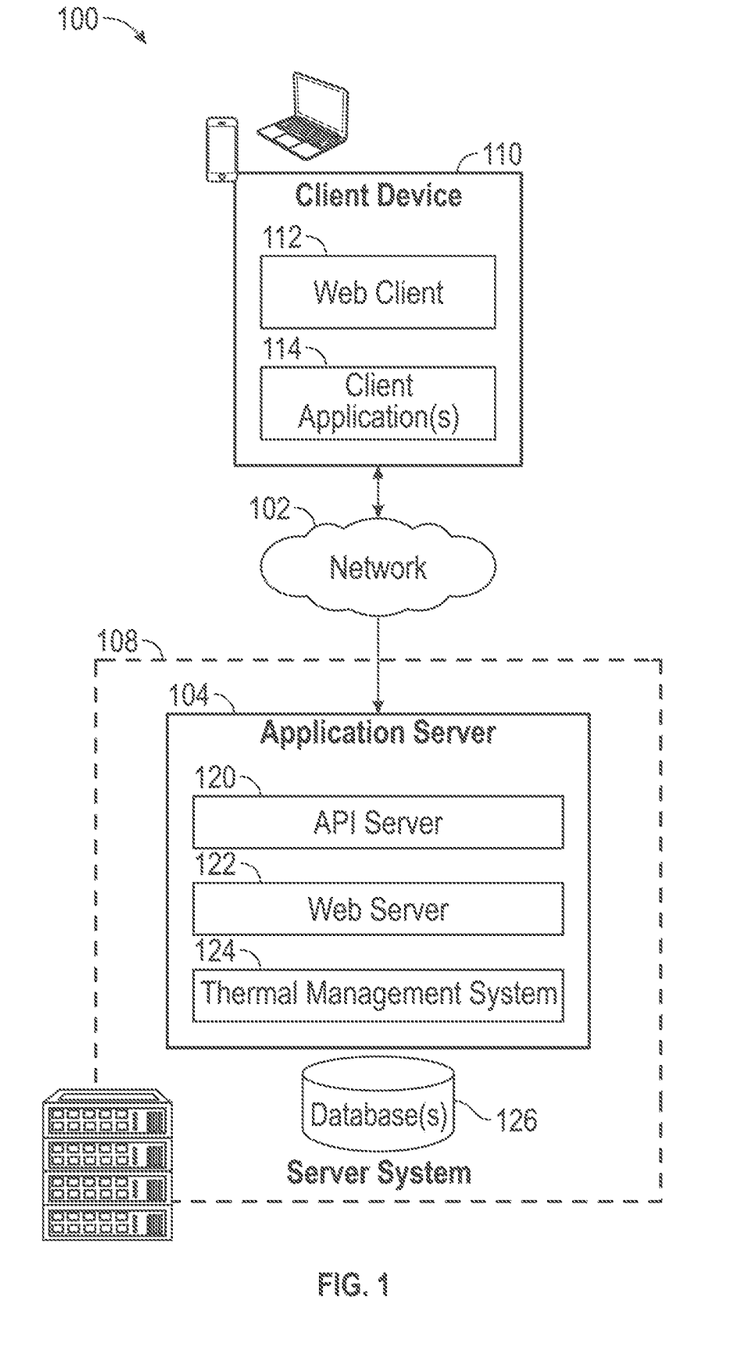
FIG. 1 is a block diagram of an example configuration management system based on thermal state.
Figure 9:
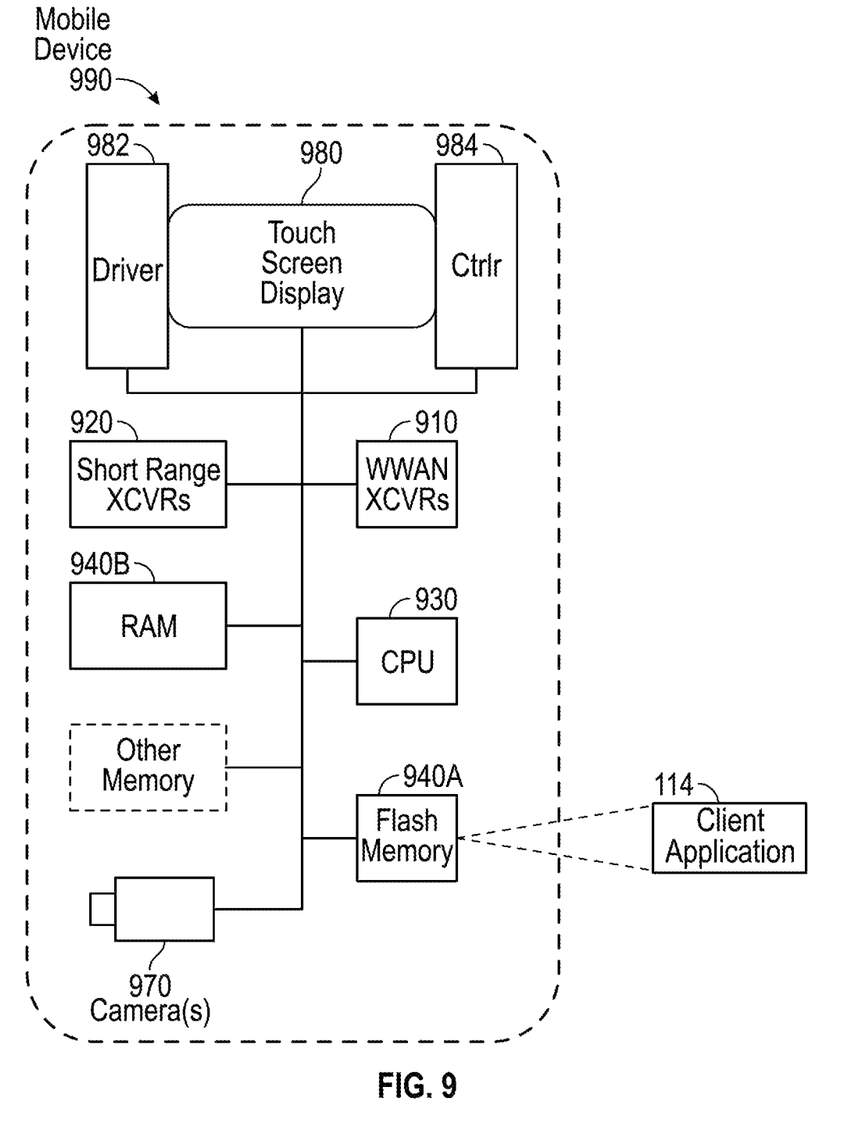
FIG. 9 is a diagrammatic representation of an example hardware configuration for a client device embodied as a mobile device.

FIG. 1 is a block diagram illustrating a system 100, according to some examples, configured to detect thermal throttling. The system 100 includes one or more client devices such as client device 110. The client device 110 comprises, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the system 100. In some examples, the client device 110 comprises a display module (not shown) to display information, e.g., by user interface (e.g., as shown in FIG. 9). In further examples, the client device 110 comprises one or more of touch screens, accelerometers, gyroscopes, cameras, microphones, global positioning system (GPS) devices, and so forth. The client device 110 may be a device of a user that is used to access and utilize an online social platform. One or more users may be a person, a machine, or other means of interacting with the client device 110. In examples, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., server system 108, etc.) via the network 102. In this instance, the other entities in the system 100, in response to receiving the input from the user, may communicate information to the client device 110 via the network 102 to be presented to the user.

The system 100 further includes network 102. One or more portions of network 102 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access various data and applications provided by other entities in the system 100 via web client 112 (e.g., a browser) or one or more client applications 114. The client device 110 may include one or more client application(s) 114 (also referred to as "apps") such as, but not limited to, a web browser, messaging application, electronic mail (email) application, an e-commerce site application, a mapping or location application, an online home buying and selling application, a real estate application, and the like. In some examples, one or more client application(s) 114 are included in a given one of the client device 110, and configured to locally provide a user interface and at least some of the functionalities, with the client application(s) 114 configured to communicate with other entities in the system 100 (e.g., server system 108, etc.), on an as-needed basis, for data processing capabilities not locally available (e.g., to access location information, to authenticate a user, etc.).

Figure 2:
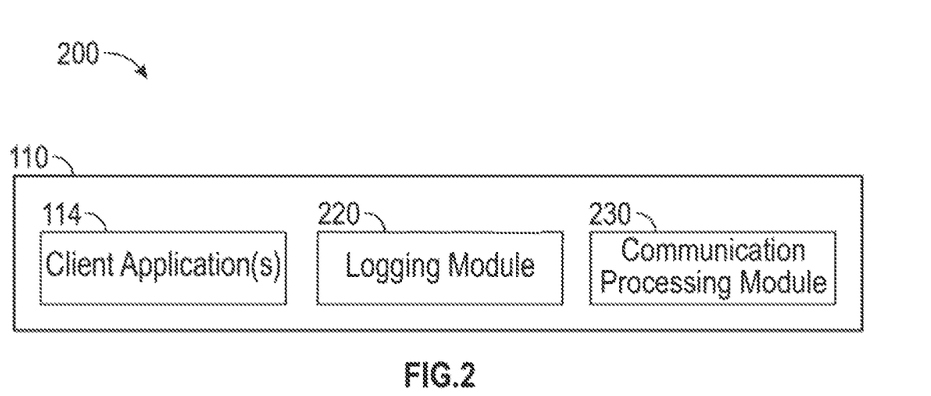
FIG. 2 is a block diagram illustrating an example configuration management system consistent with the present disclosure.

FIG. 2 illustrates a system block diagram 200 of an example further illustrating device 110 showing, in addition to client application(s) 114, logging module 220 and communication processing module 230. In some examples logging module 220 may be used to logs events autonomously or associated with user or remote configuration activity. Communication processing module 230 may be used to provide communication from the device 110 to a remote server such as server system 108.

Figure 3:
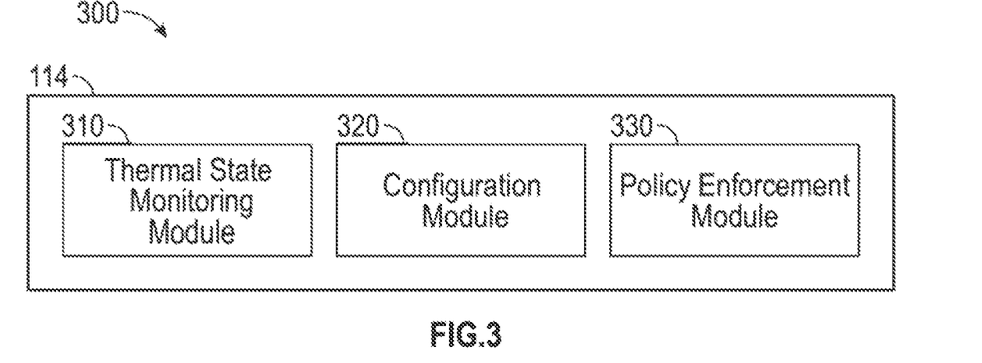
FIG. 3 is a block diagram illustrating an example configuration management system consistent with the present disclosure.

FIG. 3 is a block diagram 300 of an example client application(s) 114 consistent with the present disclosure. Client application 114 comprises thermal state monitoring module (TSMM) 310, configuration module 320, and policy enforcement module 330. Thermal state monitoring module 310 monitors CPU (central processing unit) frequency and load to infer the thermal state of device 110 by monitoring events logged via logging module 220 such as a user's configuration activity. Monitoring may be continuous, or according to a predetermined period (i.e, scheduled in advance), or initiated in response to a user-initiated interaction with the device 110. In some examples thermal state monitoring module 310 combines core frequency and load information to create an operation index for the core during one or more sampling periods. For multi-thread applications or where multiple single-thread applications are being run concurrently, operation indexes for each core can be summed to create a master operation index. To infer the thermal state of the device 110, the thermal state monitoring module 310 evaluates the logged CPU frequency and load to determine the maximum frequency that a CPU (i.e, core) can run at to assess the CPU's maximum operating frequency. At a later time, if the load factor is maximum, thereby indicating a 100% utilization rate, but the CPU frequency is lower than the maximum frequency previously logged, it is inferred that device 110 is in a thermally throttled thermal state. Thermal state monitoring module 310 may be configured to monitor thermal states associated with the systems of FIGS. 1, 9 and 10.

Configuration module 320 may provide a user of device 110 with the capability to configure the thermal management of the device 110 by setting thermal thresholds and thermal configuration settings specifying thermal management policies and performance preferences. In some examples, client application 114 may provide the user with options to increase performance or provide an improved experience based on current device usage. For example, client application 114 may provide details to the user regarding the current operation index (or master operational index) and the corresponding thermal requirements and how this may affect device performance. In some examples, thermal thresholds can be set in terms of the operation index of by a proxy for the operation index on a scale that reflects user-relevant endpoints.

In some examples, the user may choose a desired performance mode of operation. In some examples a high performance or low performance mode of operation based on this information can be set. In one example the choice of performance mode based on client input via client application 114 changes the configuration of the client application 114 such that one or more suitable algorithms are employed. In some examples, the particular algorithm may affect user-level functionality, such as facial recognition. For instance, if the user selects a lower performance mode, the face recognition algorithm may be less resource-intensive but also less accurate in determining facial detection.

In some examples, the settings may allow a user to select (e.g., toggle button) via client application 114 whether certain functionalities of the application may be suspended while the device 110 is in a throttled state.

In some examples the user may configure preferences through client application 114 via display 980 (shown in FIG. 9 and discussed below), while in other examples the user may configure preferences through the internet 102 and remote server 108, then through client application 114.

Policy enforcement module 330 may implement a stored thermal management policy that has been associated with a violation of one of the thermal thresholds by one of the monitored thermal states. Selection of a particular policy for implementation may depend on user input, the current user, the current mode of operation of the device, or a combination of foregoing. Thermal management policies may include taking actions such as decreasing (or otherwise adjusting) a clock frequency and load of a processor or other hardware component as noted above, adjusting the amount of speculative work that the device performs, adjusting the amount of non-critical tasks, or a combination of one or more of the foregoing.

Speculative work includes, for example, executing tasks associated with various filters that may be needed, e.g., request climate information such a current temperature and format prior to reaching a filter that includes this information, or the application may preload information for future tasks based on prior actions by a user. However, when thermal state monitoring module 210 detects that device 110 is in a throttled state, client application 114 may reduce the speculative work that application 114 typical performs when the device is in its unthrottled state to allow the device to dissipate heat and improve the user's experience.

The performance of non-critical tasks that can be reduced includes backing up of data.

When the device is in a throttled state, the policy of adjusting speculative or non-critical tasks will typically include reducing execution of such tasks to allow the device to dissipate heat and improve the user's experience.

In some examples, the policy enforcement module may include a default stored policy setting for client device 110 in the absence of user input.

In the event of potential violations, selection or recommended modifications to the policy may be formulated and provided to the user. These recommendations may be based on user preferences set through client application 114. The policies may be customized to depend on the current operational mode of the device 110 such as, for example, web browsing, GPS location servicing, or placing a phone call.

Figure 4:
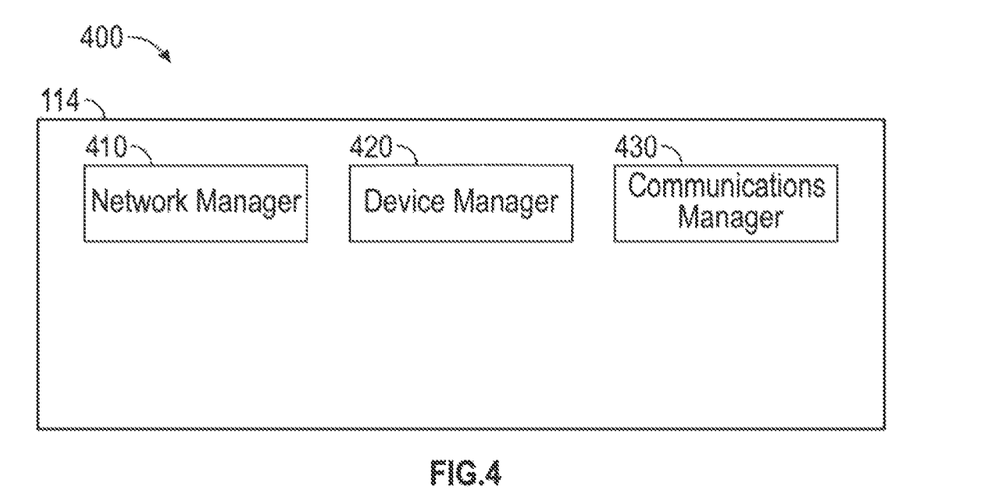
FIG. 4 is a block diagram illustrating an example configuration management system consistent with the present disclosure.

FIG. 4 is a block diagram 400 of an example client application(s) 114 consistent with the present disclosure. Client application 114 may include multiple components such as a network manager 410, a device manager 420, and a communications manager 430. When device 110 exceeds its thermal threshold based on a user's thermal configuration settings, a stored policy is implemented that may include reducing the execution of speculative and/or non-critical tasks via adjusting the activity of one or more of the components of FIG. 4. For example, the activity of network manager 410 may be adjusted to reduce the execution of speculative and/or non-critical tasks.

Although the following flowcharts may describe the operations as a sequential process, many of the operations can be performed in parallel or concurrently. In addition, the order of the operations may be re-arranged. A process is terminated when its operations are completed. A process may correspond to a method, a procedure, etc. The steps of method may be performed in whole or in part, may be performed in conjunction with some or all of the steps in other methods, and may be performed by any number of different systems, such as the systems described in: FIG. 1, and FIG. 9.

Figure 5:
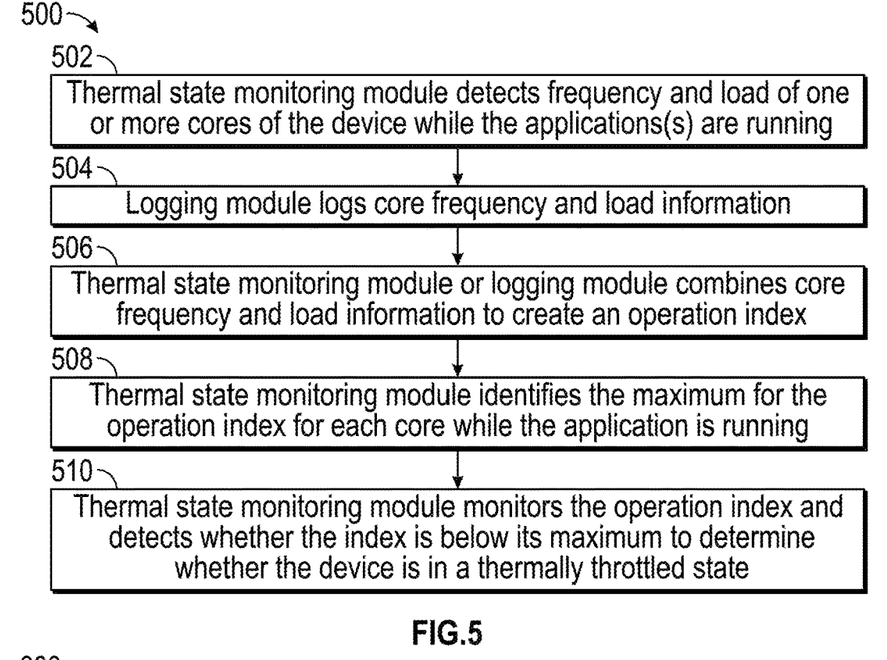
FIG. 5 is a flow diagram illustrating an example method consistent with the present disclosure.

FIG. 5 is a flow diagram illustrating an example method for monitoring and determining thermal management according to an example. Referring to FIG. 5, the method 500 starts with the thermal monitoring module 310 of the client application 114 detecting frequency and load of one or more CPUs/cores of device 110 while the application(s) is running at operation 502.

At operation 504, the logging module 220 logs core frequency and load information obtained by the thermal monitoring module 310 of client application 114.

At operation 506, the client application 114 combines core frequency and load information from logging module 220 to create an operation index for the core during one or more sampling periods that may or may not be predetermined, such as according to a scheduled period or a period otherwise determined in advance. For multi-thread applications or where multiple single-thread applications are being run concurrently, operation indexes for each core can be summed to create a master operation index.

At operation 508, client application 114 identifies the maximum for the operation index for each core while the application is running and/or a master operation index for all cores running either while the application is running.

At operation 510, client application 114 monitors the operation index and/or the master operation index and detect whether the operation index (or master operation index) is below its maximum to determine whether device 110 is in a thermally throttled state.

Figure 6:
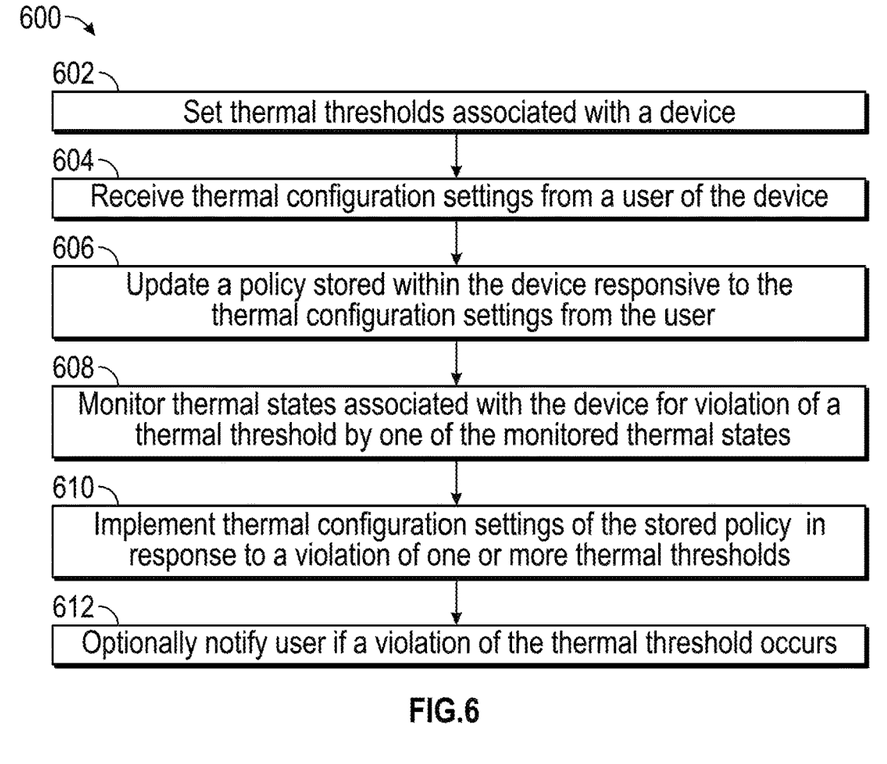
FIG. 6 is a flow diagram illustrating an example method consistent with the present disclosure.

FIG. 6 is a flow diagram illustrating a flowchart of operations 600 of another example consistent with the present disclosure.

At operation 602, thermal thresholds are set based on user input either directly via client device 110 or via client application 114 running on device 110 or via web client 112.

At operation 604, a user of device 110 inputs their desired thermal configuration settings for the device. In some examples, the settings may be specific to the operation index, or may be based on a pre-determined mode (e.g., "high-performance mode" or "low-performance mode") or specific functionalities can be individually selected not to be performed while the device is in a throttled state.

At operation 606, based on the user's thermal configuration settings, a policy stored within device 110 is updated to reflect those thermal configuration settings.

At operation 608, thermal states associated with device 110 are monitored to detect any violation of the thermal threshold setting.

At operation 610, a stored policy associated with a violation of the thermal threshold by one of the monitored thermal states is implemented.

In some examples, the policies may be stored locally or remotely such as, for example, in a cloud server where they may be downloaded or accessed from one or more user devices by a user via client application 114.

Server system 108 provides server-side functionality via the network 102 (e.g., the Internet or wide area network (WAN)) to one or more client devices 110. The server system 108 includes an application program interface (API) server 120, a web server 122, and a server thermal management system 124, that may be communicatively coupled with one or more database(s) 126. The one or more database (s) 126 may be storage devices that store data related to users of the server system 108, applications associated with the server system 108, cloud services, housing market data, and so forth. The one or more database(s) 126 may further store information related to client device 110, client application(s) 114, users, and so forth. In one example, the one or more database(s) 126 may be cloud-based storage. The server system 108 may be a cloud computing environment, according to some examples. The server system 108, and any servers associated with the server system 108, may be associated with a cloud-based application, in one example.

In some examples, application 114 communicates the thermal status through internet 102 to server system 108 which in turn may remotely implement thermal management policies and performance preferences based on information gathered by thermal state monitoring module 310.

In some examples one or more client application(s) 114 may not be included in the client device 110, and then the client device 110 may use its web browser to access the one or more applications hosted on other entities in the system 100 such as server system 108.

Referring back to FIG. 1, server system 108 includes server thermal management system 124. Thermal management system 124 may include one or more servers and may be associated with a cloud-based application.

Figure 7:
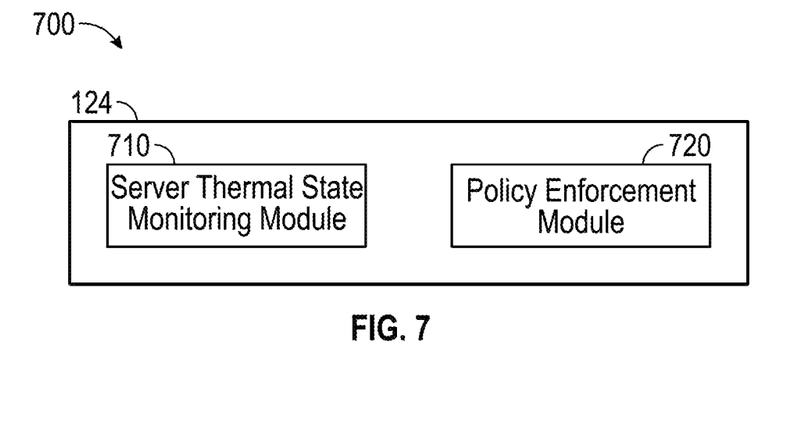
FIG. 7 is a block diagram of an example consistent with the present disclosure.

FIG. 7 is a block diagram 700 of an example server such as server 108 comprising thermal management system 124 consistent with the present disclosure. Server thermal management system 124 comprises server thermal state monitoring module 710 and policy enforcement module 720. The thermal state monitoring module 710 of server 108 may receive CPU information (frequency and load) from thermal state monitoring module 310 via communication processing module 230 (shown in FIG. 2), and in some examples, further analyzes the device for potential thermal throttling when device 110 is running client application 114. In some examples server thermal state monitoring module 710 may upon identifying thermal throttling of device 110 invoke policy enforcement module 720 to implement a remotely stored policy residing in module 720 or modify a locally stored policy within policy enforcement module 330 in application 114 on device 112.

Figure 8:
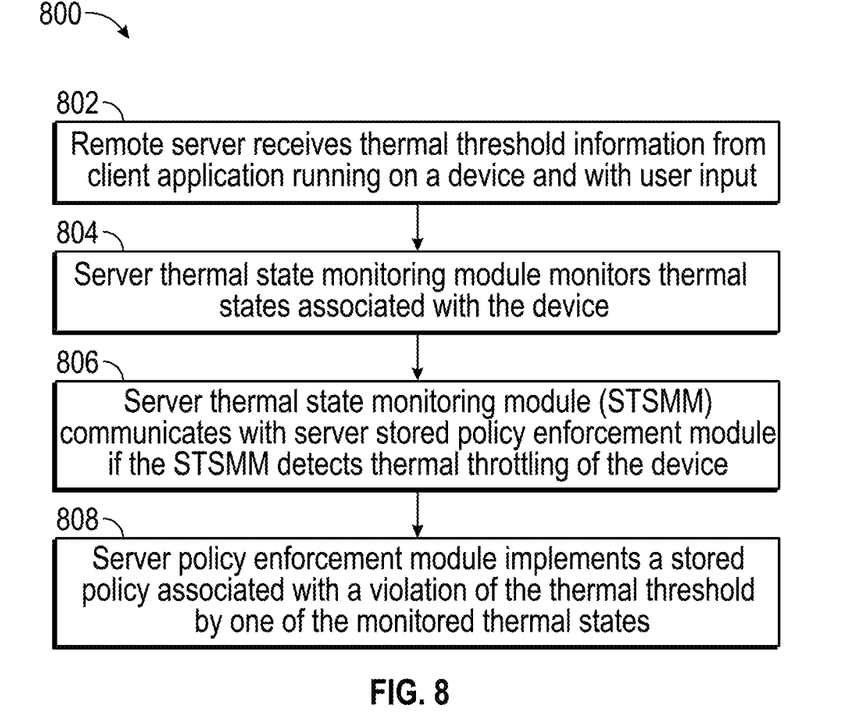
FIG. 8 is a flow diagram illustrating an example method consistent with the present disclosure.

FIG. 8 is a flow diagram illustrating a flowchart of operations 800 of an example method consistent with the present disclosure.

At operation 802, remote server 108 receives thermal threshold information from client application 144 running on device 110 received via communication processing module 230 of device 110 and network 102.

At operation 804, the server thermal state monitoring module (STSMM) 710 monitors thermal states associated with the device. In some examples the STSMM evaluates thermal state information received from application 114 and determines the throttle threshold of device 110 has been violated. In some examples, STSMM received a determination by thermal state monitoring module 310.

At operation 806, STSMM 710 communicates with server policy enforcement module if the STSMM detects thermal throttling of the device or receives a determination by thermal state monitoring module 310 of application 114 on device 110.

At operation 808, server policy enforcement module implements a stored policy associated with a violation of the thermal threshold by one of the monitored thermal states. In some examples the server policy enforcement module comprises two or more stored policies. In some examples, the selection of a particular policy for implementation may depend on the current user, the current mode of operation of the device, or based on user input, or a combination thereof. The stored policy (or the selected policy where there are at least two stored policies) is communicated to application 114 on device 110 to adjust or reduce speculative tasks running on application 114 in an effort put the device in a thermal state that does not violate the thermal threshold.

FIG. 9 is a high-level functional block diagram of an example client device 110 exemplified as an example mobile device 990 that includes client application 114. Mobile device 990 includes a flash memory 940A which includes programming to perform all or a subset of the functions described herein for client application 114. Mobile device 990 can include a camera 970 that comprises at least two visible light cameras (first and second visible light cameras with overlapping fields of view) or at least on visible light camera and a depth sensor with substantially overlapping fields of view. Memory 940A may further include multiple images or video, which are generated via the camera 970.

As shown, the mobile device 990 includes an image display 980, an image display driver 982 to control the image display 980, and a controller 984. In the example of FIG. 9, the image display 980 and a user input device are integrated together into a touch screen display.

Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 9 therefore provides block diagram illustrations of the example mobile device 990 having a touch screen display for displaying content and receiving user input as (or as part of) the user interface.

As shown in FIG. 9, the mobile device 990 includes at least one digital transceiver (XCVR) 910, shown as WWAN XCVRs, for digital wireless communications via a wide area wireless mobile communication network. The mobile device 990 also includes additional digital or analog transceivers, such as short range XCVRs 920 for short-range network communication, such as via NFC, VLC, DECT, ZigBee, Bluetooth™, or WiFi. For example, short range XCVRs 920 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 990, the mobile device 990 can include a global positioning system (GPS) receiver. Alternatively, or additionally the mobile device 990 can utilize either or both the short range XCVRs 920 and WWAN XCVRs 910 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 910, 920.

The transceivers 910, 920 (network communication interface) conforms to one or more of the various digital wireless communication standards utilized by modern mobile networks. Examples of WWAN transceivers 910 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 910, 920 provide two-way wireless communication of information including digitized audio signals, still image and video signals, web page information for display as well as web related inputs, and various types of mobile message communications to/from the mobile device 990.

The mobile device 990 further includes a microprocessor, shown as CPU 930, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 930, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 930 or processor hardware in smartphone, laptop computer, and tablet.

The microprocessor 930 serves as a programmable host controller for the mobile device 990 by configuring the mobile device 990 to perform various operations, for example, in accordance with instructions or programming executable by processor 930. For example, such operations may include various general operations of the mobile device, as well as operations related to the programming for the client application 114. Although a processor may be configured by use of hardwired logic, typical processors in mobile devices are general processing circuits configured by execution of programming.

The mobile device 990 includes a memory or storage device system, for storing data and programming. In the example, the memory system may include a flash memory 840A and a random access memory (RAM) 940B. The RAM 1040B serves as short term storage for instructions and data being handled by the processor 830, e.g., as a working data processing memory. The flash memory 840A typically provides longer term storage.

Hence, in the example of mobile device 890, the flash memory 840A is used to store programming or instructions for execution by the processor 830. Depending on the type of device, the mobile device 890 stores and runs a mobile operating system through which specific applications, including programming for client application 114 is executed, including thermal state monitoring, configuration, and policy enforcement modules. Applications such as client application 114 may be a native application, a hybrid application, or a web application (e.g., a dynamic web page executed by a web browser) that runs on mobile device 890. Examples of mobile operating systems include Google Android, Apple iOS (I-Phone or iPad devices), Windows Mobile, Amazon Fire OS, RIM BlackBerry operating system, or the like.

Figure 10:
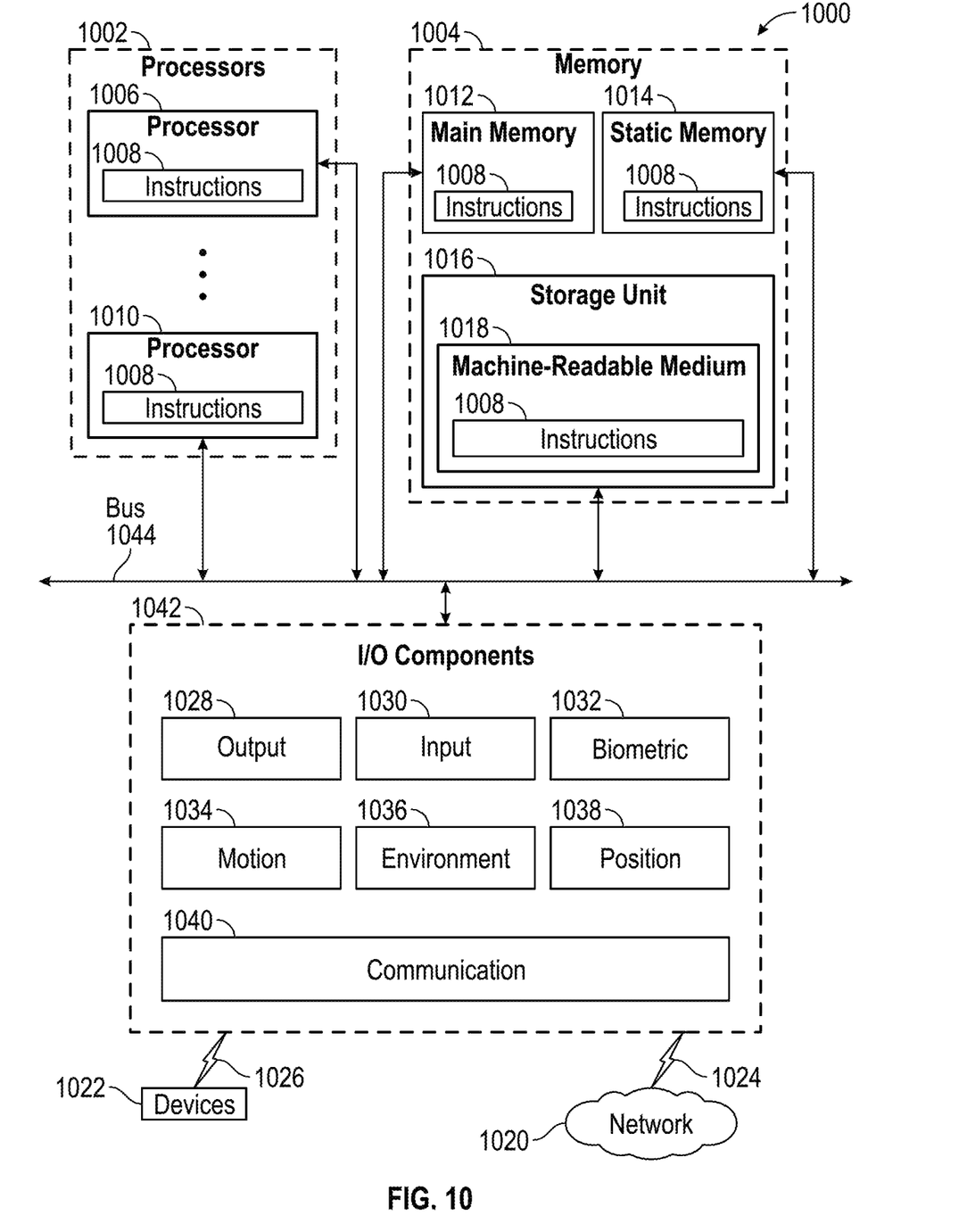
FIG. 10 is a diagrammatic representation of a machine in the form of a computer system within which a set of instructions may be executed for causing the machine to perform any one or more of the methodologies described herein, in accordance with some examples.

FIG. 10 is a diagrammatic representation of a machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment.

The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein.

The machine 1000 may include processors 1002, memory 1004, and I/O components 1042, which may be configured to communicate with each other via a bus 1044. In an example, the processors 1002 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, both accessible to the processors 1002 via the bus 1044. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 (e.g., a non-transitory machine-readable storage medium) within the storage unit 1016, within at least one of the processors 1002 (e.g., within the processor's cache memory), or any suitable combination thereof, during execution thereof by the machine 1000.

Furthermore, the machine-readable medium 1018 is non-transitory (in other words, not having any transitory signals) in that it does not embody a propagating signal. However, labeling the machine-readable medium 1080 "non-transitory" should not be construed to mean that the medium is incapable of movement; the medium should be considered as being transportable from one physical location to another. Additionally, since the machine-readable medium 1018 is tangible, the medium may be a machine-readable device.

The I/O components 1042 may include a wide variety of components to receive input, provide output, produce output, transmit information, exchange information, capture measurements, and so on. The specific I/O components 1042 that are included in a particular machine will depend on the type of machine. For example, portable machines such as mobile phones may include a touch input device or other such input mechanisms, while a headless server machine will likely not include such a touch input device. It will be appreciated that the I/O components 1042 may include many other components that are not shown in FIG. 10. In various examples, the I/O components 1042 may include output components 1028 and input components 1030. The output components 1028 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1030 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 1042 may include biometric components 1032, motion components 1034, environmental components 1036, or position components 1038, among a wide array of other components. For example, the biometric components 1032 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 include acceleration sensor components (e.g., accelerometer), gravitation sensor components, rotation sensor components (e.g., gyroscope), and so forth. The environmental components 1036 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1042 further include communication components 1040 operable to couple the machine 1000 to a network 1020 or devices 1022 via a coupling 1024 and a coupling 1026, respectively. For example, the communication components 1040 may include a network interface component or another suitable device to interface with the network 1020. In further examples, the communication components 1040 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1022 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

The various memories (e.g., memory 1004, main memory 1012, static memory 1014, memory of the processors 1002), storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1040) and using any one of a number of well-known transfer protocols (e.g., hypertext transfer protocol (HTTP)). Similarly, the instructions 1008 may be transmitted or received using a transmission medium via the coupling 1026 (e.g., a peer-to-peer coupling) to the devices 1022.

Figure 11:
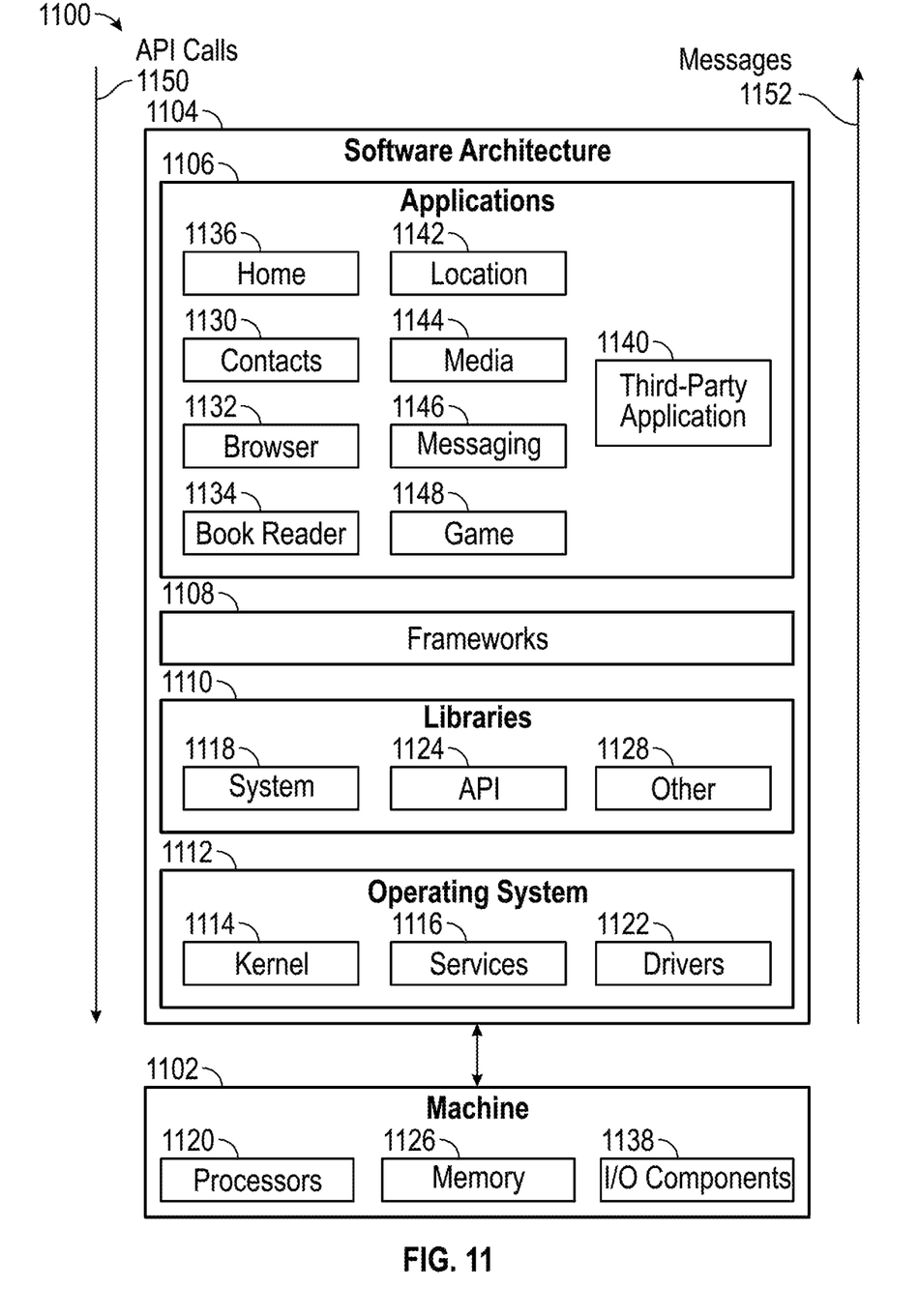
FIG. 11 is block diagram showing a software architecture within which aspects of the present disclosure may be implemented, in accordance with some examples.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1110 provide a low-level common infrastructure used by the applications 1006. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a high-level common infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1150 provided by the operating system 1112 to facilitate functionality described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like, whether or not qualified by a term of degree (e.g. approximate, substantially or about), may vary by as much as ±10% from the recited amount.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

The invention claimed is:

1. A method for configuring an application on a device, the application comprising at least one component, the method comprising:
setting, by a processor, a maximum thermal threshold for the device, the device including at least one central processing unit (CPU), each CPU including a plurality of cores;
monitoring, by the processor, processing load and frequency of each core of the at least one CPU;
generating a master operation index by averaging the processing load and frequency of each core of each of the at least one CPU, combining the averaged processing load and frequency of each core to provide an operation index for each of the at least one CPU, and summing the operation indexes; and
configuring the application by adjusting the at least one component when the master operation index exceeds the maximum thermal threshold.

2. The method of claim 1, wherein the at least one component includes a plurality of components.

3. The method of claim 2, wherein the plurality of components includes a device manager or communications manager.

4. The method of claim 2, wherein the configuring includes adjusting at least two components of the plurality of components.

5. The method of claim 1, wherein the maximum thermal threshold is adjusted in response to thermal configuration settings.

6. The method of claim 5, wherein the thermal configuration settings are received from a user.

7. The method of claim 6, wherein the setting the maximum thermal threshold from the user further comprises selecting a desired mode by the user.

8. The method of claim 7, wherein the desired mode is a low-performance mode or a high-performance mode.

9. The method of claim 8, wherein the high-performance mode comprises reducing execution of speculative tasks, non-critical tasks, or both.

10. The method of claim 6, wherein the receiving thermal configuration settings further comprises:
selecting by a user one or more functions not to be executed when the master operation index exceeds the maximum thermal threshold.

11. The method of claim 1, further comprising adjusting a CPU frequency according to a stored policy.

12. The method of claim 1, further comprising:
providing notification to a user when the master operation index exceeds the maximum thermal threshold.

13. The method of claim 1, wherein the method further comprises:
communicating, by the processor, the maximum thermal threshold to a remote server.

14. The method of claim 13, wherein the remote server comprises a server stored policy.

15. The method of claim 14, wherein the server stored policy is communicated to the application on the device.

16. A system, comprising:
a memory that stores instructions; and
a processor configured by the instructions to perform operations comprising:
setting, by a processor, a maximum thermal threshold for a device comprising an application comprising at least one component, the device including at least one central processing unit (CPU), each CPU including a plurality of cores;
monitoring, by the processor, processing load and frequency of each core of the at least one CPU;
generating a master operation index by averaging the processing load and frequency of each core of each of the at least one CPU, combining the averaged processing load and frequency of each core to provide an operation index for each of the at least one CPU, and summing the operation indexes; and
configuring the application by adjusting the at least one component when the master operation index exceeds the maximum thermal threshold.

17. The system of claim 16, wherein the maximum thermal threshold is adjusted in response to thermal configuration settings.

18. The system of claim 17, wherein the thermal configuration settings are received from a user.

19. The system of claim 18, further comprising:
a user interface wherein the user interface is configured to receive the thermal configuration settings from the user.

20. A non-transitory processor-readable storage medium storing processor-executable instructions that, when executed by a processor of a device, cause the device comprising at least one component to perform operations comprising:
setting a maximum thermal threshold for the device, the device comprising an application comprising at least one component, the device including at least one central processing unit (CPU), each CPU including a plurality of cores;
monitoring processing load and frequency of each core of the at least one CPU;
generating a master operation index by averaging the processing load and frequency of each core of each of the at least one CPU, combining the averaged processing load and frequency of each core to provide an operation index for each of the at least one CPU, and summing the operation indexes; and
configuring the application by adjusting the at least one component when the master operation index exceeds the maximum thermal threshold.

* * * * *